US010199908B2

(12) United States Patent
Akiyoshi et al.

(10) Patent No.: US 10,199,908 B2
(45) Date of Patent: Feb. 5, 2019

(54) AUTOMOTIVE ALTERNATOR

(71) Applicant: Mitsubishi Electric Corporation, Tokyo (JP)

(72) Inventors: Masao Akiyoshi, Tokyo (JP); Yuzuru Kobayashi, Tokyo (JP); Kyoko Higashino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 26 days.

(21) Appl. No.: 15/516,983

(22) PCT Filed: Nov. 21, 2014

(86) PCT No.: PCT/JP2014/080901
§ 371 (c)(1),
(2) Date: Apr. 5, 2017

(87) PCT Pub. No.: WO2016/079866
PCT Pub. Date: May 26, 2016

(65) Prior Publication Data
US 2017/0324306 A1    Nov. 9, 2017

(51) Int. Cl.
*H02K 9/04* (2006.01)
*H02K 11/04* (2016.01)
(Continued)

(52) U.S. Cl.
CPC .......... *H02K 11/046* (2013.01); *H02K 5/16* (2013.01); *H02K 9/06* (2013.01); *H02K 11/33* (2016.01)

(58) Field of Classification Search
CPC ............. H02K 9/04; H02K 9/06; H02K 9/22
(Continued)

(56) References Cited

U.S. PATENT DOCUMENTS 5,982,062 A    11/1999   Gautier
6,707,691 B2    3/2004   Bradfield
(Continued)

FOREIGN PATENT DOCUMENTS

CN    102754315 A    10/2012
CN    103682706 A    3/2014
(Continued)

OTHER PUBLICATIONS

International Search Report of PCT/JP2014/080901, dated Feb. 17, 2015. [PCT/ISA/210].
(Continued)

*Primary Examiner* — Terrance Kenerly
(74) *Attorney, Agent, or Firm* — Sughrue Mion, PLLC; Richard C. Turner

(57) ABSTRACT

In this rectifying apparatus, a circuit board is disposed between a first rectifying element holding portion and a second rectifying element holding portion such that first rectifying element connecting portions are disposed in a loosely fitted state inside a second penetrating aperture that is formed on the second rectifying element holding portion, and second rectifying element connecting portions are disposed in a loosely fitted state inside a first penetrating aperture that is formed on the first rectifying element holding portion; first leading electrodes of a plurality of first rectifying elements respectively extend axially and are connected to each of the first rectifying element connecting portions; and second leading electrodes of a plurality of second rectifying elements respectively extend axially and are connected to each of the second rectifying element connecting portions.

7 Claims, 8 Drawing Sheets

(51) Int. Cl.
*H02K 9/06* (2006.01)
*H02K 11/33* (2016.01)
*H02K 5/16* (2006.01)

(58) Field of Classification Search
USPC .............................................. 310/62, 63, 64
See application file for complete search history.

(56) References Cited

U.S. PATENT DOCUMENTS

| | | | | |
|---|---|---|---|---|
| 7,015,607 | B1* | 3/2006 | Ikuta | H02K 11/046 310/58 |
| 7,378,766 | B2* | 5/2008 | Vasilescu | F28D 15/0233 310/58 |
| 7,723,875 | B2* | 5/2010 | Fakes | H02K 5/20 310/58 |
| 7,902,701 | B2* | 3/2011 | Ito | H02K 11/046 310/64 |
| 9,450,477 | B2* | 9/2016 | Creviston | H02K 11/05 |
| 2011/0175469 | A1* | 7/2011 | Oohashi | H02K 9/28 310/62 |
| 2012/0126638 | A1* | 5/2012 | Tanaka | H02K 11/046 310/43 |
| 2012/0306300 | A1 | 12/2012 | Ishikawa et al. | |
| 2012/0326572 | A1* | 12/2012 | Konaya | H02K 9/06 310/60 R |
| 2014/0084711 | A1 | 3/2014 | Tanaka | |
| 2014/0339931 | A1 | 11/2014 | Tanaka et al. | |

FOREIGN PATENT DOCUMENTS

| | | |
|---|---|---|
| DE | 10260845 A1 | 7/2004 |
| EP | 0 388 953 A2 | 9/1990 |
| EP | 0 388 953 A3 | 9/1990 |
| JP | 47-32318 A | 11/1972 |
| JP | 2-122570 U | 10/1990 |
| JP | 9-107666 A | 4/1997 |
| JP | 2001-231232 A | 8/2001 |
| JP | 2001-231233 A | 8/2001 |
| JP | 3346410 B2 | 11/2002 |
| JP | 2014-68427 A | 4/2014 |
| WO | 2011/111246 A1 | 9/2011 |
| WO | 2013/132653 A1 | 9/2013 |

OTHER PUBLICATIONS

Communication dated Sep. 3, 2018, from the State Intellectual Property Office of People's Republic of China in counterpart Application No. 201480083371.9.

* cited by examiner

AUTOMOTIVE ALTERNATOR

CROSS REFERENCE TO RELATED APPLICATIONS

This application is a National Stage of International Application No. PCT/JP2014/080901 filed Nov. 21, 2014, the contents of all of which are incorporated herein by reference in their entirety.

TECHNICAL FIELD

The present invention relates to an automotive alternator that is driven by a vehicle engine to generate electric power, and particularly relates to a rectifying apparatus that rectifies alternating-current electric power that arises in a stator winding.

BACKGROUND ART

Conventional rectifying apparatuses have included: a positive-side heatsink; a negative-side heatsink that is disposed so as to be spaced apart axially from the positive-side heatsink; and a terminal assembly that is disposed between the positive-side heatsink and the negative-side heatsink, positive-side diodes and negative-side diodes being held on the positive-side heatsink and the negative-side heatsink by press-fitting so as to face each other axially (see Patent Literature 1, for example).

Other conventional automotive alternator rectifying apparatuses have included: a positive-side radiating fin that bears high-level-side rectifying elements, and that is connected to the cathodes of the high-level-side rectifying elements; a negative-side radiating fin that bears low-level-side rectifying elements, and that is connected to the anodes of the low-level-side rectifying elements; a terminal block in which anodes of the high-level-side rectifying elements, cathodes of the low-level-side rectifying elements, and terminals that connect phase output ends of a stator coil are formed integrally, the terminal block being mounted to a frame; and a frame that has air intake apertures for cooling airflows, and that fixes the terminal block, the frame also functioning as a negative-side radiating fin, the low-level-side rectifying elements being disposed so as to face the high-level-side rectifying elements, and end portions of the anodes of the high-level-side rectifying elements extending into the air intake apertures (see Patent Literature 2, for example).

CITATION LIST

Patent Literature

Patent Literature 1: U.S. Pat. No. 6,707,691 (Specification)
Patent Literature 2: Japanese Patent No. 3346410 (Gazette)

SUMMARY OF THE INVENTION

Problem to be Solved by the Invention

In the conventional rectifying apparatus that is described in Patent Literature 1, the positive-side and negative-side diodes are disposed so as to face each other axially, leads of the positive-side and negative-side diodes are extended axially so as to approach each other, and are then bent perpendicularly and formed so as to extend to a radially outer side, to achieve reductions in axial dimensions of the rectifying apparatus. However, it is necessary to bend the leads of the positive-side and negative-side diodes perpendicularly, reducing reliability, and a step of bending, and bending jigs, etc., are also required, and one problem has been that manufacturing costs are increased.

In the conventional automotive alternator rectifying apparatus that is described in Patent Literature 2, the low-level-side rectifying elements are disposed so as to face the high-level-side rectifying elements, and end portions of the anodes of the high-level-side rectifying elements are formed so as to extend into the air intake apertures, eliminating any need to bend the anodes, thereby increasing reliability, and achieving reductions in rectifying apparatus size. However, because the base wall portion of the terminal block and an inner wall portion that supports terminals to which the anodes are connected are adjacent to the end portions of the anodes of the high-level-side rectifying elements, a vicinity of the air intake apertures is in a blocked state. Thus, the positive-side radiating fin and the terminal block hinder a portion of a flow of cooling air that flows axially, reducing amount of draw of cooling air from external space into the rear cover, and one problem has been that cooling of the generator is reduced.

The present invention aims to solve the above problems and an object of the present invention is to provide an automotive alternator that can reduce axial dimensions of a rectifying apparatus while suppressing reductions in reliability of rectifying elements and cooling of the alternator.

Means For Solving the Problem

An automotive alternator according to the present invention includes: a housing; a rotor that is rotatably disposed inside the housing by being fixed to a shaft that is rotatably supported by means of bearings in bearing mounting portions that are formed on two axial end portions of the housing such that a central axis thereof is aligned with an axial direction of the housing; a stator that has: a cylindrical stator core; and a stator winding that is mounted to the stator core, the stator being held by the housing so as to be disposed coaxially around an outer circumference of the rotor; a fan that is fixed to a first axial end surface of the rotor, and that is rotated together with the rotor; a rectifying apparatus that is disposed outside a first axial end of the housing; a protective cover that is formed so as to have a cylindrical cup shape, that is disposed on the first axial end of the housing so as to cover the rectifying apparatus, and on a floor portion of which a suction aperture for cooling air is formed in a region that corresponds to the rectifying apparatus; an air intake aperture that is formed on a wall surface of the housing that faces the first axial end surface of the rotor; and an air discharge aperture that is formed on a wall surface of the housing that faces a coil end at a first axial end of the stator winding, a flow channel being configured such that the cooling air flows into the protective cover through the suction aperture due to rotation of the fan, cools the rectifying apparatus, and then flows through the air intake aperture into the housing, is deflected centrifugally by the fan, and is discharged through the air discharge aperture. The rectifying apparatus includes: a first heatsink that has a flat first rectifying element holding portion that is disposed in a plane that is perpendicular to the axial direction of the housing; a plurality of first rectifying elements that are held by the first rectifying element holding portion; a second heatsink that has a flat second rectifying element holding portion that is disposed in a plane that is perpendicular to the axial direction of the housing, the second rectifying element holding portion being spaced apart from the first rectifying element holding portion toward the housing; a plurality of second rectifying elements that are each held by the second rectifying element holding portion; and a circuit board that has a stator winding connecting portion, a voltage regulator connecting portion, first rectifying element connecting portions, second rectifying element connecting portions, and a housing linking portion; the circuit board is disposed between the first rectifying element holding portion and the second rectifying element holding portion such that the first rectifying element connecting portions are disposed in a loosely fitted state inside a second penetrating aperture that is formed on the second rectifying element holding portion, and the second rectifying element connecting portions are disposed in a loosely fitted state inside a first penetrating aperture that is formed on the first rectifying element holding portion; first leading electrodes of the plurality of first rectifying elements respectively extend axially and are connected to each of the first rectifying element connecting portions; and second leading electrodes of the plurality of second rectifying elements respectively extend axially and are connected to each of the second rectifying element connecting portions.

EFFECTS OF THE INVENTION

According to the present invention, the circuit board is disposed between the first rectifying element holding portion and the second rectifying element holding portion such that the first rectifying element connecting portions are disposed in a loosely fitted state inside a second penetrating aperture that is formed on the second rectifying element holding portion, and the second rectifying element connecting portions are disposed in a loosely fitted state inside a first penetrating aperture that is formed on the first rectifying element holding portion; first leading electrodes of the plurality of first rectifying elements respectively extend axially and are connected to each of the first rectifying element connecting portions; and second leading electrodes of the plurality of second rectifying elements respectively extend axially and are connected to each of the second rectifying element connecting portions. Thus, because lengths of the first leading electrodes of the first rectifying elements and the second leading electrodes of the second rectifying elements are shorter, axial dimensions of the rectifying apparatus can be made more compact. Furthermore, it is not necessary to bend the first leading electrodes and the second leading electrodes perpendicularly, increasing reliability, and a step of bending, and bending jigs, etc., are also no longer required, enabling manufacturing costs to be reduced. In addition, because the first leading electrodes and the second leading electrodes are connected to the first rectifying element connecting portions and the second rectifying element connecting portions that are disposed inside the second penetrating apertures of the second rectifying element holding portion and inside the first penetrating apertures of the first rectifying element holding portion, and are not in a state in which vicinities of the suction apertures and the air intake apertures are blocked, the amount of draw of cooling air through the suction apertures and the air intake apertures is ensured, suppressing deterioration in the cooling of the generator.

DESCRIPTION OF EMBODIMENTS

Preferred embodiments of an automotive alternator according to the present invention will now be explained with reference to the drawings.
Embodiment 1

Figure 1:
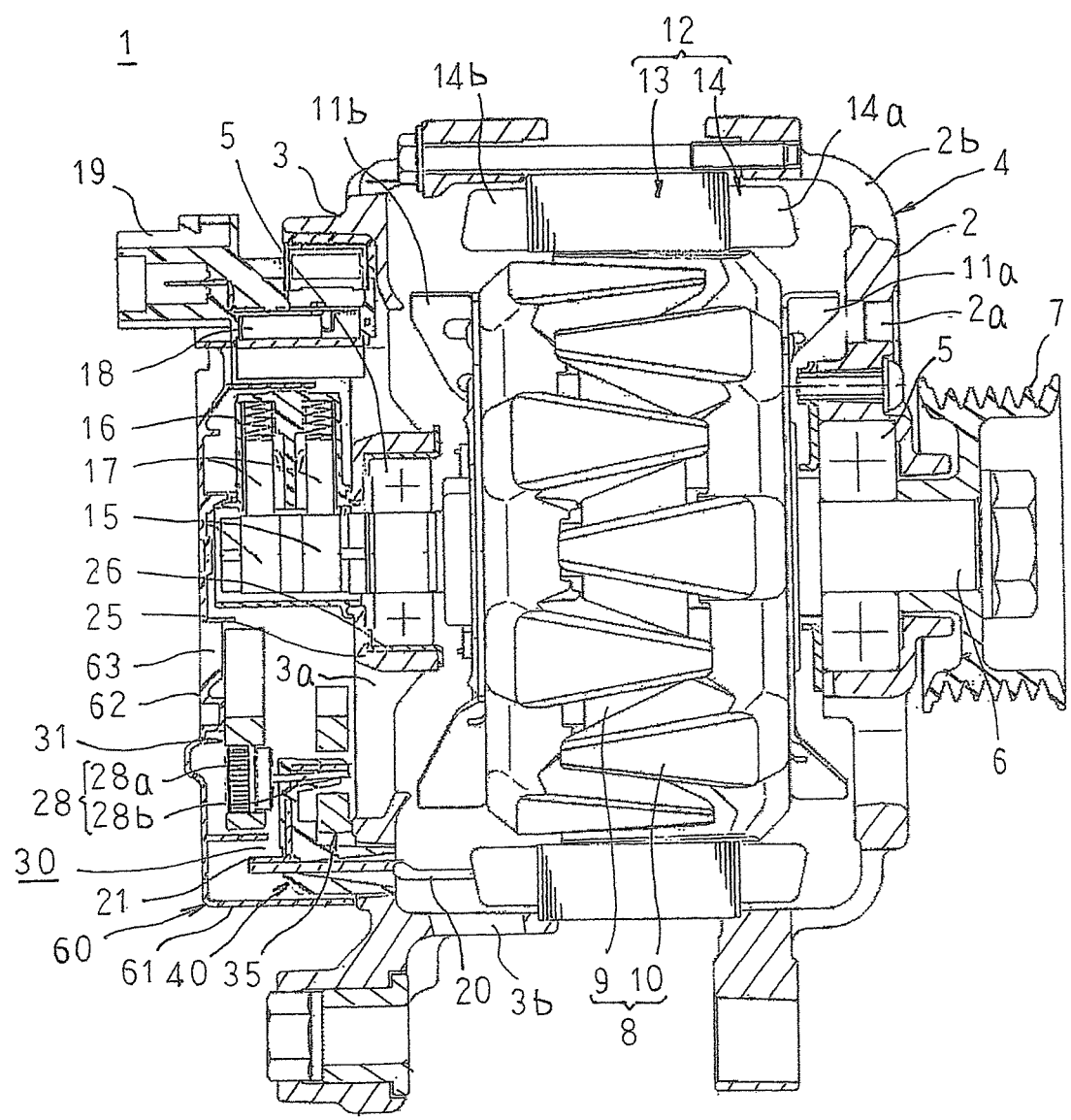
FIG. 1 is a longitudinal cross section that shows an automotive alternator according to Embodiment 1 of the present invention.
Figure 2:
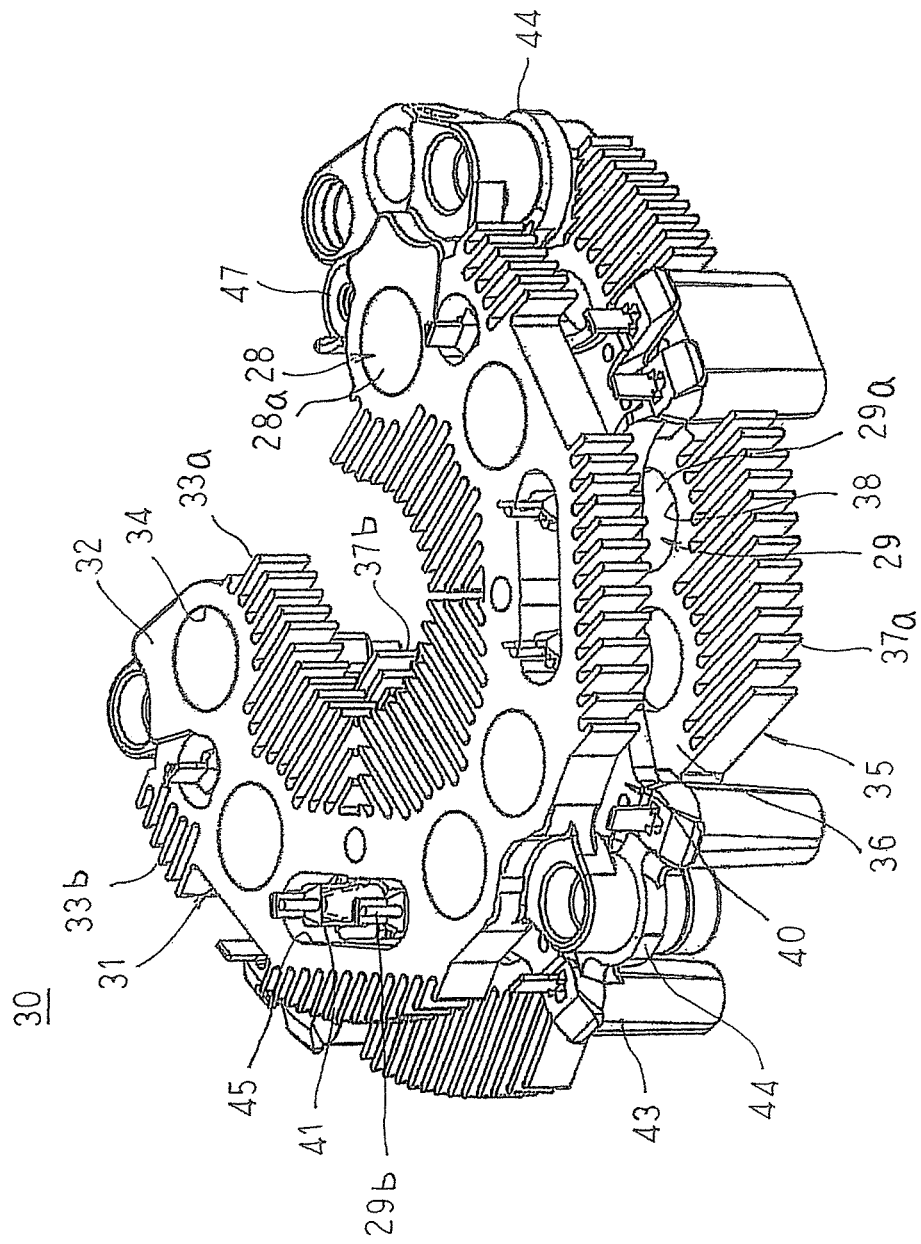
FIG. 2 is an oblique projection of a rectifying apparatus in the automotive alternator according to Embodiment 1 of the present invention viewed from a side near a first heatsink.
Figure 3:
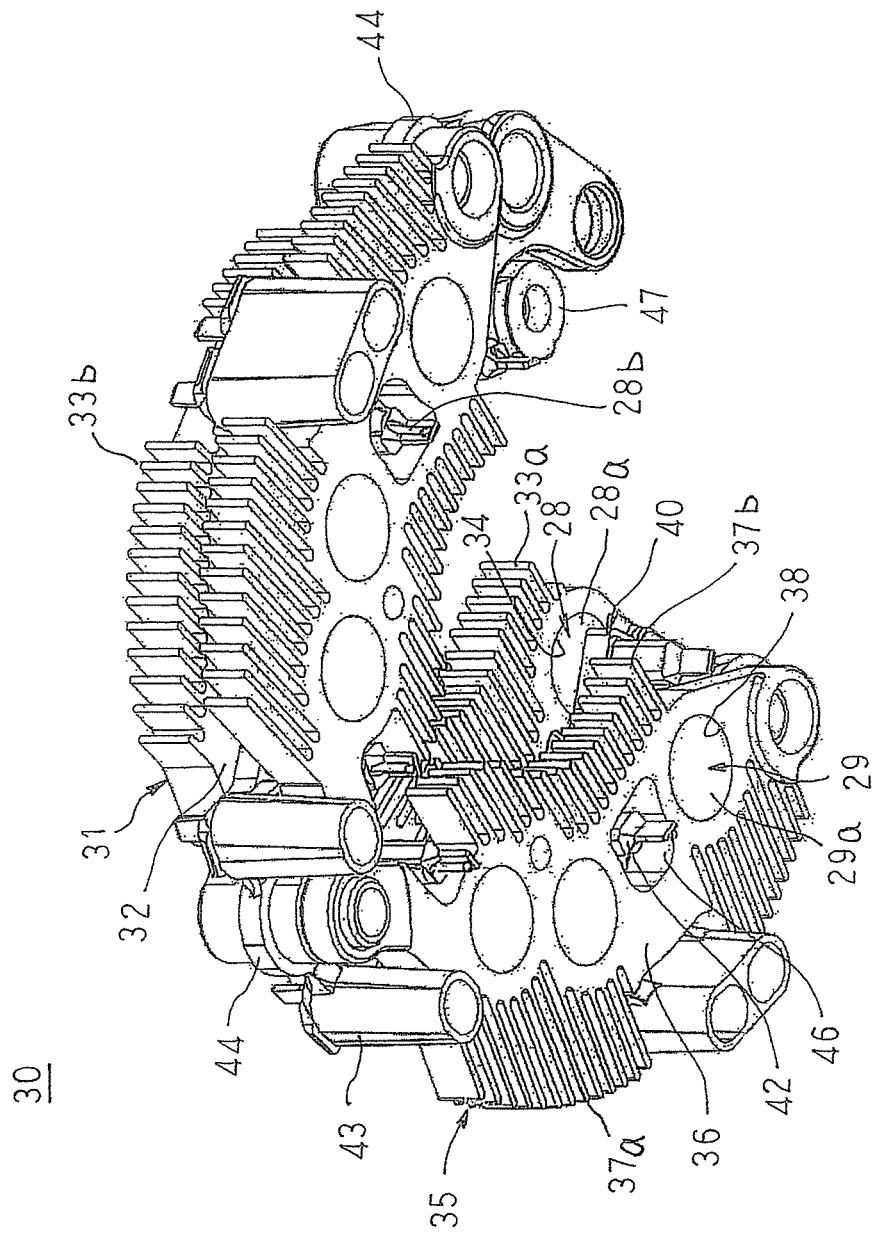
FIG. 3 is an oblique projection of the rectifying apparatus in the automotive alternator according to Embodiment 1 of the present invention viewed from a side near a second heatsink.
Figure 4:
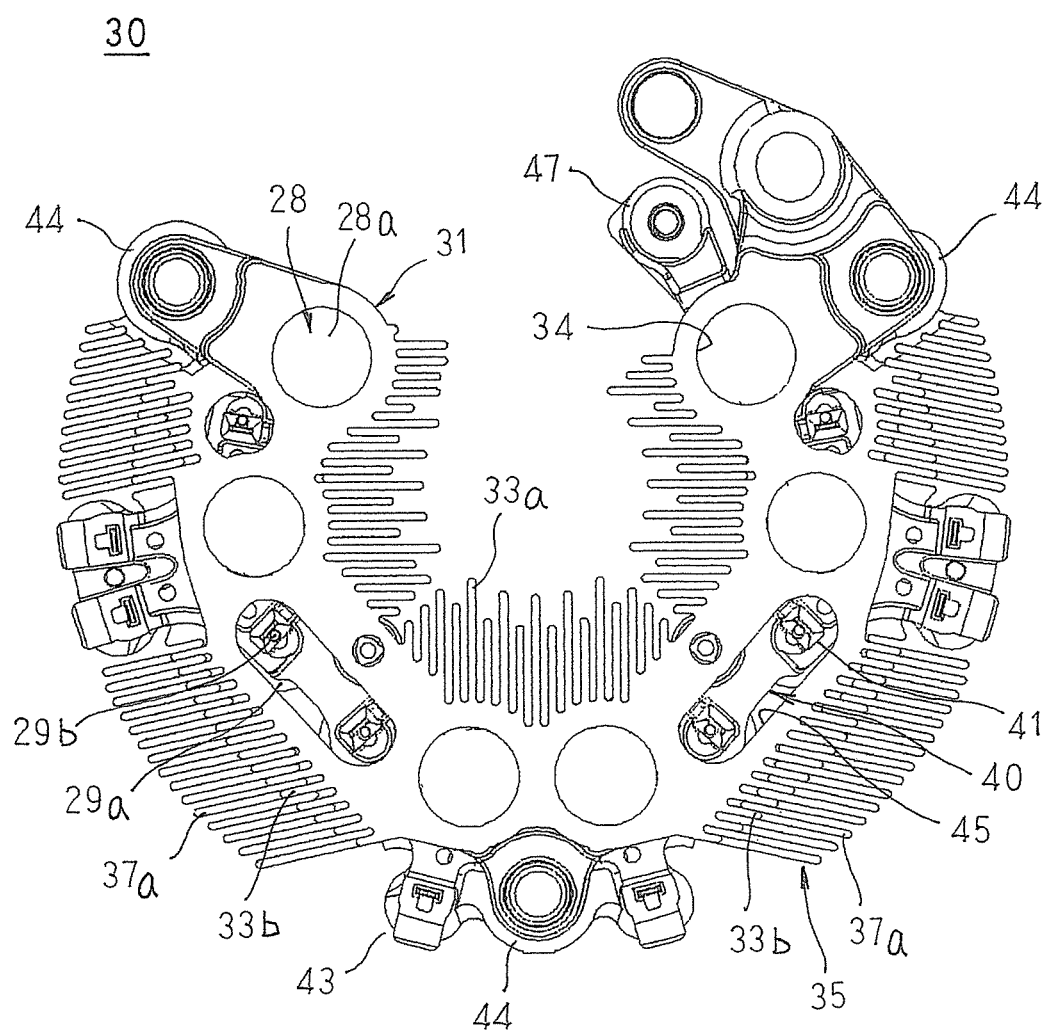
FIG. 4 is a front elevation of the rectifying apparatus in the automotive alternator according to Embodiment 1 of the present invention viewed from the side near the first heatsink.
Figure 5:
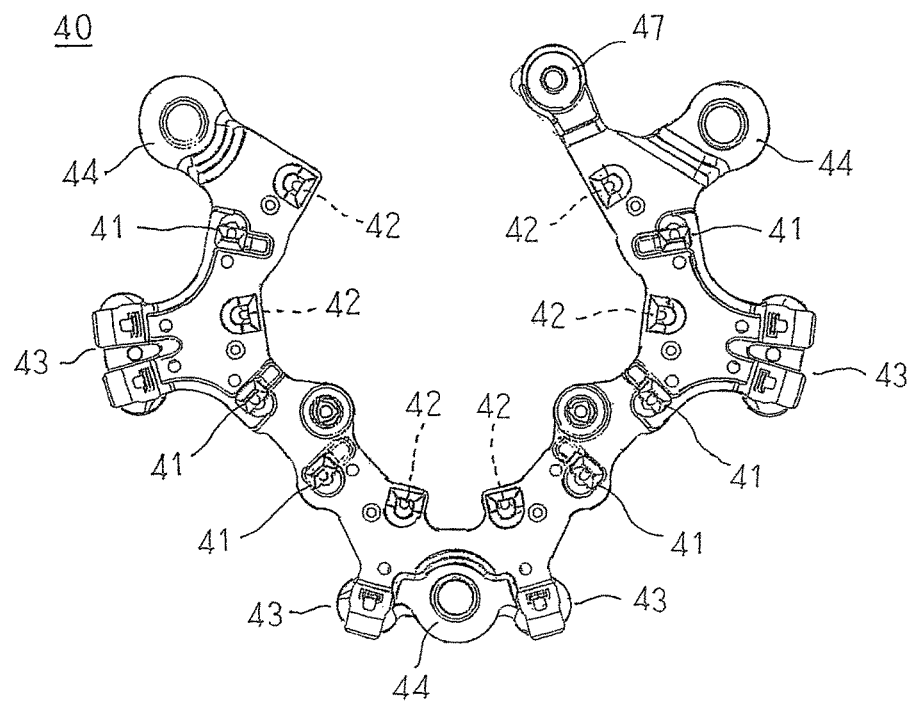
FIG. 5 is a front elevation that shows a circuit board that constitutes part of the rectifying apparatus in the automotive alternator according to Embodiment 1 of the present invention.
Figure 6:
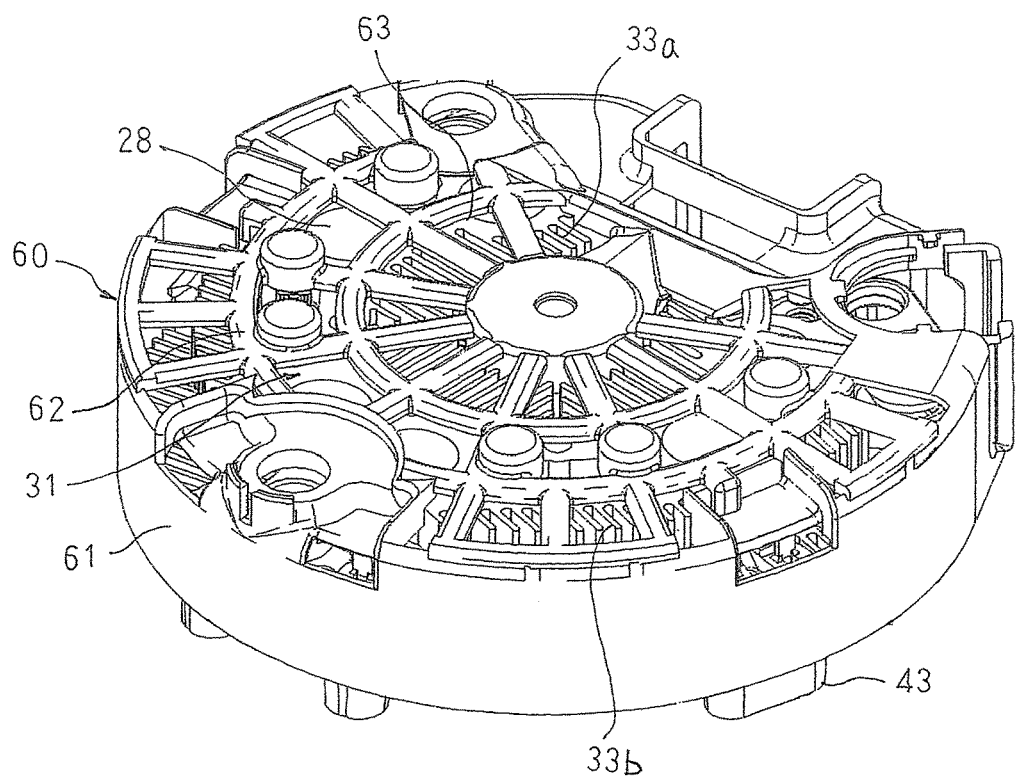
FIG. 6 is an oblique projection that shows a state in which a cover is mounted to the rectifying apparatus in the automotive alternator according to Embodiment 1 of the present invention.
Figures 7, 8:
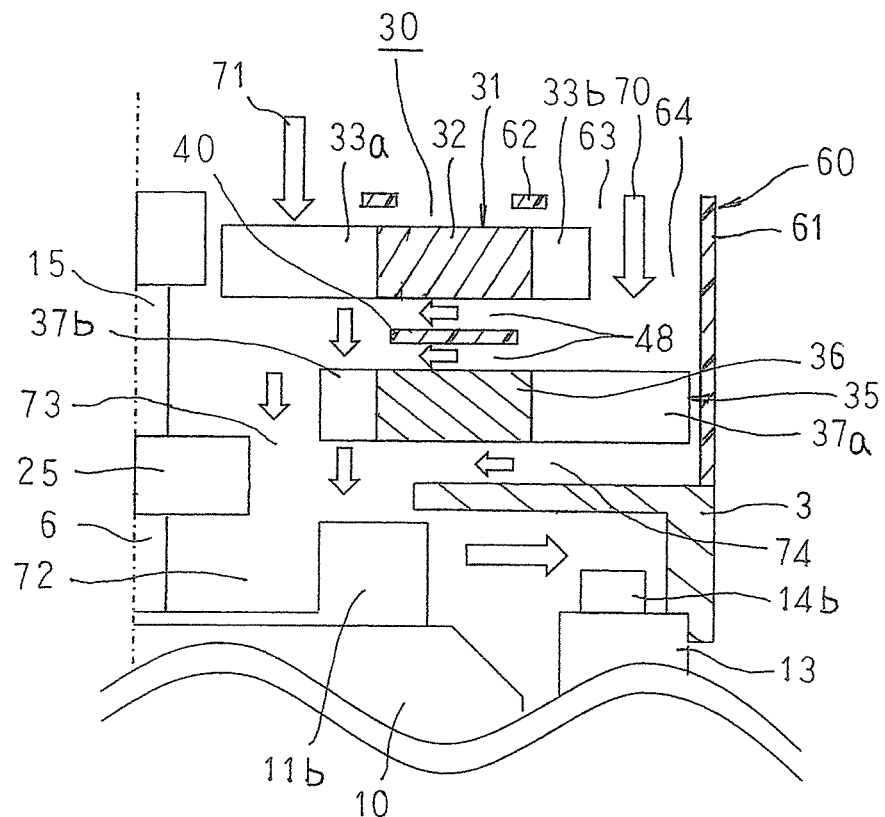
FIG. 7 is a schematic diagram that explains main flow of cooling air in a vicinity of the rectifying apparatus in the automotive alternator according to Embodiment 1 of the present invention.
FIG. 8 is a schematic diagram that explains another flow of cooling air in a vicinity of the rectifying apparatus in the automotive alternator according to Embodiment 1 of the present invention.

FIG. 1 is a longitudinal cross section that shows an automotive alternator according to Embodiment 1 of the present invention, FIG. 2 is an oblique projection of a rectifying apparatus in the automotive alternator according to Embodiment 1 of the present invention viewed from a side near a first heatsink, FIG. 3 is an oblique projection of the rectifying apparatus in the automotive alternator according to Embodiment 1 of the present invention viewed from a side near a second heatsink, FIG. 4 is a front elevation of the rectifying apparatus in the automotive alternator according to Embodiment 1 of the present invention viewed from the side near the first heatsink, FIG. 5 is a front elevation that shows a circuit board that constitutes part of the rectifying apparatus in the automotive alternator according to Embodiment 1 of the present invention, FIG. 6 is an oblique projection that shows a state in which a cover is mounted to the rectifying apparatus in the automotive alternator according to Embodiment 1 of the present invention, FIG. 7 is a schematic diagram that explains main flow of cooling air in a vicinity of the rectifying apparatus in the automotive alternator according to Embodiment 1 of the present invention, and FIG. 8 is a schematic diagram that explains another flow of cooling air in a vicinity of the rectifying apparatus in the automotive alternator according to Embodiment 1 of the present invention. Moreover, in FIGS. 7 and 8, cooling air flow is represented by arrows.

In FIG. 1, an automotive alternator 1 includes: a housing 4 that is constituted by a front bracket 2 and a rear bracket 3 that are each approximately bowl-shaped and made of aluminum; a shaft 6 that is rotatably supported in the housing 4 by means of a pair of bearings 5; a pulley 7 that is fixed to an end portion of the shaft 6 that projects out frontward from the housing 4; a rotor 8 that is fixed to the shaft 6 and that is disposed inside the housing 4; fans 11a and 11b that are fixed to two axial end surfaces of the rotor 8; a stator 12 that is fixed to the housing 4 so as to surround the rotor 8; a pair of slip rings 15 that are fixed to a portion of the shaft 6 that projects out rearward from the housing 4, and that supply electric current to the rotor 8; a rectifying apparatus 30 that is prepared so as to have an approximate C shape, that is disposed outside the slip rings 15 in a fan shape that is centered around the shaft 6 in a plane that is perpendicular to the shaft 6, and that rectifies alternating-current voltages that are generated in the stator 12; a pair of brushes 17 that are housed inside a brush holder 16 that is disposed outside the pair of slip rings 15 between ends of the approximate C shape of the rectifying apparatus 30, and that slide on the respective slip rings 15; a voltage regulator 18 that is mounted to the brush holder 16 and that adjusts magnitude of the alternating-current voltages that are generated in the stator 12; a connector 19 that is disposed at the rear end of the rear bracket 3, and that performs input and output of signals between the voltage regulator 18 and external devices (not shown); and a protective cover 60 that is made of an insulating resin, that is mounted to the rear bracket 3 so as to cover the rectifying apparatus 30, the brush holder 16, and the voltage regulator 18.

The rotor 8 includes: a field winding 9 that generates magnetic flux on passage of an excitation current; and a pole core 10 that is disposed so as to cover the field winding 9, and in which magnetic poles are formed by the magnetic flux. The stator 12 includes: a cylindrical stator core 13; and a stator winding 14 that is mounted into the stator core 13, and in which an alternating current is generated by changes in the magnetic flux from the field winding 9 that accompany rotation of the rotor 8, and is disposed such that the stator core 13 is held by the front bracket 2 and the rear bracket 3 from two axial ends so as to surround the rotor 8. Here, the rotor 8 has twelve poles, and the number of slots that are formed on the stator core 13 is seventy-two. In other words, the slots are formed at a ratio of two slots per phase per pole. The stator winding 14 is constituted by two wye-connected three-phase alternating-current windings.

Air intake apertures 2a and 3a are formed on axial end surfaces of the front bracket 2 and the rear bracket 3. Air discharge apertures 2b and 3b are formed on outer circumferential edge portions of the front bracket 2 and the rear bracket 3 so as to be positioned radially outside coil ends 14a and 14b of the stator winding 14. A rear-end bearing 5 is fixed by means of a holder 26 to a bearing mounting portion 25 that is disposed on the rear bracket 3.

Next, configuration of the rectifying apparatus 30 will be explained with reference to FIGS. 2 through 5.

As shown in FIGS. 3 and 4, the rectifying apparatus 30 has: a first heatsink 31 to which six positive-side rectifying elements 28 that function as first rectifying elements are mounted; a second heatsink 35 to which six negative-side rectifying elements 29 that function as second rectifying elements are mounted, and that is disposed so as to be spaced apart on a rear surface side of the first heatsink 31; and a circuit board 40 that is disposed between the first heatsink 31 and the second heatsink 35, and that connects the positive-side rectifying elements 28 and the negative-side rectifying elements 29 so as to configure bridge circuits.

The first heatsink 31 is made of aluminum, for example and, as shown in FIGS. 2 through 4, includes: a first rectifying element holding portion 32 that is produced into an approximately circular arc belt-shaped flat plate; and a plurality of first radially inner fins 33a and first radially outer fins 33b that are formed so as to protrude from an inner circumferential surface and an outer circumferential surface of the first rectifying element holding portion 32. Six first rectifying element holding apertures 34 are each formed so as to pass through the first rectifying element holding portion 32, and are arranged in a single row in an approximate circular arc shape in a circumferential direction so as to be separated from each other in the circumferential direction.

The second heatsink 35 is made of aluminum, for example and, as shown in FIGS. 2 through 4, includes: a second rectifying element holding portion 36 that is produced into an approximately circular arc belt-shaped flat plate; and a plurality of second radially outer fins 37a and second radially inner fins 37b that are formed so as to protrude from an outer circumferential surface and an inner circumferential surface of the second rectifying element holding portion 36. Six second rectifying element holding apertures 38 are each formed so as to pass through the second rectifying element holding portion 36, and are arranged in a single row in an approximate circular arc shape in a circumferential direction so as to be separated from each other in the circumferential direction.

Here, outlines of the first rectifying element holding portion 32 and the second rectifying element holding portion 36 align approximately when viewed from a thickness direction. As shown in FIG. 4, the respective second radially inner fins 37b extend in identical directions to the first radially inner fins 33a so as not to protrude from the first radially inner fins 33a when viewed from an axial direction when the first heatsink 31 and the second heatsink 35 are stacked in the thickness direction such that the outlines of the first rectifying element holding portion 32 and the second rectifying element holding portion 36 align approximately, and protruding ends of the first radially inner fins 33a are positioned radially further inward than protruding ends of the second radially inner fins 37b. The respective first radially inner fins 33b extend in identical directions to the second radially outer fins 37a so as not to protrude from the second radially outer fins 37a when viewed from an axial direction when the first heatsink 31 and the second heatsink 35 are stacked in the thickness direction such that the outlines of the first rectifying element holding portion 32 and the second rectifying element holding portion 36 align approximately, and protruding ends of the first radially outer fins 33b are positioned radially further inward than protruding ends of the second radially outer fins 37a. Here, the first rectifying element holding apertures 34 and the second rectifying element holding apertures 38 are offset from each other in the circumferential direction such that the regions of formation thereof do not overlap in the thickness direction.

As shown in FIG. 1, the positive-side rectifying elements 28 are configured by sealing in a resin a semiconductor element that has been formed into a p-n junction, for example, and have: a leading electrode 28b that is connected to an anode; and a cylindrical copper base 28a that is connected to a cathode. The positive-side rectifying elements 28 are mounted to the first heatsink 31 by press-fitting the bases 28a into the respective first rectifying element holding apertures 34 such that the leading electrodes 28b protrude onto a rear surface side. Serrations are formed on outer circumferential surfaces of the bases 28a, ensuring sufficient engaging strength and electrical connection.

The negative-side rectifying elements 29 are configured by sealing in a resin a semiconductor element that has been formed into a p-n junction, for example, and have: a leading electrode 29b that is connected to a cathode; and a cylindrical copper base 29a that is connected to an anode. The negative-side rectifying elements 29 are mounted to the second heatsink 35 by press-fitting the bases 29a into the respective second rectifying element holding apertures 38 such that the leading electrodes 29b extend outward on a front surface side. Serrations are formed on outer circumferential surfaces of the bases 29a, ensuring sufficient engaging strength and electrical connection.

As shown in FIG. 5, the circuit board 40 is produced into an approximately circular arc belt-shaped flat plate using an insulating resin such as polyphenylene sulfide (PPS), and inserted conductors 21 that connect the positive-side rectifying elements 28 and the negative-side rectifying elements 29 so as to configure bridge circuits are insert-molded therein. Six tubular resin portions that correspond to the leading electrodes 29b of the negative-side rectifying elements 29 are disposed so as to stand at respective positions on the front surface side of the circuit board 40. Corresponding first ends of the inserted conductors 21 are exposed on inner wall surfaces of the tubular resin portions to constitute second rectifying element connecting portions 41. Six tubular resin portions that correspond to the leading electrodes 28b of the positive-side rectifying elements 28 are disposed so as to stand at respective positions on the rear surface side of the circuit board 40. Corresponding first ends of the inserted conductors 21 are exposed on inner wall surfaces of the tubular resin portions to constitute first rectifying element connecting portions 42. In addition, six tubular resin portions are each disposed so as to stand on front surface sides of radially overhanging portions of the circuit board 40. Corresponding second ends of the inserted conductors 21 are exposed on inner wall surfaces of the tubular resin portions to constitute stator winding connecting portions 43 to which output wires 20 of the stator winding 14 are connected. Housing linking portions 44 that are linked to the rear bracket 3 are formed at three positions including a central portion and two end portions in a circumferential direction of the circuit board 40. In addition, a voltage regulator connecting portion 47 that is linked to the voltage regulator 18 is formed at a first circumferential end of the circuit board 40.

To assemble the rectifying apparatus 30 that is configured in this manner, the first heatsink 31 is first disposed on the front surface side of the circuit board 40 such that the leading electrodes 28b of the positive-side rectifying elements 28 are inserted into the apertures of the first rectifying element connecting portions 42 from the front surface side of the circuit board 40. The second heatsink 35 is also disposed on the rear surface side of the circuit board 40 such that the leading electrodes 29b of the negative-side rectifying elements 29 are inserted into the apertures of the second rectifying element connecting portions 41 from the rear surface side of the circuit board 40. Next, using the second rectifying element connecting portions 41, the leading electrodes 29b of the negative-side rectifying elements 29 are extended in the thickness direction of the first heatsink 31 without being bent, and are welded to the first ends of the inserted conductors 21. Next, using the first rectifying element connecting portions 42, the leading electrodes 28b of the positive-side rectifying elements 28 are extended in the thickness direction of the first heatsink 31 without being bent, and are welded to the first ends of the inserted conductors 21, to assemble the rectifying apparatus 30. In this manner, two three-phase diode bridges are configured that are formed by arranging in parallel three rectifying element pairs that have been configured by connecting the positive-side rectifying elements 28 and the negative-side rectifying elements 29 in series.

Here, the circuit board 40 is disposed so as to be spaced apart from the first rectifying element holding portion 32 and the second rectifying element holding portion 36 in an axial direction. The first rectifying element connecting portions 42 are disposed in a loosely fitted state inside second penetrating apertures 46 that are formed so as to pass through the second rectifying element holding portion 36 of the second heatsink 35. The second rectifying element connecting portions 41 are disposed in a loosely fitted state inside first penetrating apertures 45 that are formed so as to pass through the first rectifying element holding portion 32 of the first heatsink 31.

As shown in FIG. 4, the rectifying apparatus 30 that is assembled in this manner is configured so as to have an approximate C shape when viewed from the thickness direction of the first heatsink 31 in which the first heatsink 31, the circuit board 40, and the second heatsink 35 are stacked sequentially in the thickness direction of the first heatsink 31. In the circuit board 40 that is sandwiched between the first heatsink 31 and the second heatsink 35, the stator winding connecting portions 43, the housing linking portions 44, the voltage regulator connecting portion 47, and peripheral portions thereof protrude outward from the stacked body including the first heatsink 31 and the second heatsink 35 when viewed from the thickness direction of the first heatsink 31, and vicinities of the second rectifying element connecting portions 41 and the first rectifying element connecting portions 42 are exposed inside the first penetrating apertures 45 and the second penetrating apertures 46. Furthermore, the protruding ends of the first radially inner fins 33a and the first radially outer fins 33b are positioned radially further inward than the protruding ends of the second radially inner fins 37b and the second radially outer fins 37a. Cooling airflow channels that are parallel to the thickness direction of the first heatsink 31 and the second heatsink 35 are configured between the adjacent first radially inner fins 33a, between the adjacent first radially outer fins 33b, between the adjacent second radially inner fins 37b, and between the adjacent second radially outer fins 37a. The first radially inner fins 33a, the first radially outer fins 33b, the second radially inner fins 37b, and the second radially outer fins 37a are not formed on the stator winding connecting portions 43, the housing linking portions 44, the voltage regulator connecting portion 47, and the peripheral portions thereof.

This rectifying apparatus 30 is disposed in a circular arc shape on an outer circumferential side of the slip rings 15 such that the thickness direction of the first heatsink 31, i.e., the direction of stacking of the first heatsink 31, the circuit board 40, and the second heatsink 35, is oriented in an axial direction, and such that the second heatsink 35 faces toward an end surface of the rear bracket 3. Then the rectifying apparatus 30 is fixed to the rear bracket 3 by fastening bolts (not shown) that are passed through the housing linking portions 44 to the rear bracket 3. The rectifying apparatus 30 is thereby disposed at the rear end of the rear bracket 3 in an approximate circular arc shape that is centered around the shaft 6 such that the front surface of the first heatsink 31 is positioned in a plane that is perpendicular to the shaft 6. The output wires 20 of the two three-phase alternating-current windings that constitute the stator winding 14 are each led out rearward from the rear bracket 3, are inserted into resin portions of the stator winding connecting portions 43, and are welded to the second ends of the inserted conductors 21. The voltage regulator connecting portion 47 is fastened to the voltage regulator 18 by screws. In addition, as shown in FIGS. 1 and 6, the protective cover 60 is mounted to the rear bracket 3 from axially rearward so as to cover the rectifying apparatus 30, the brush holder 16, and the voltage regulator 18.

The protective cover 60 is produced using an insulating resin into a cylindrical cup shape that includes: a cylindrical portion 61; and a floor portion 62 that closes an opening at a first end of the cylindrical portion 61. A plurality of suction apertures 63 are formed in a region of the floor portion 62 of the protective cover 60 that faces the rectifying apparatus 30. A space 73 that is surrounded by the bearing mounting portion 25 and the second heatsink 35, and a space 64 that is surrounded by the first heatsink 31, the second heatsink 35, and the cylindrical portion 61, are formed inside the protective cover 60.

In this automotive alternator 1, output terminal bolts (not shown) are mounted to the first heatsink 31, are electrically connected to the cathodes of each of the positive-side rectifying elements 28 through the first heatsink 31, and constitute output terminals of the rectifying apparatus 30. The anodes of each of the negative-side rectifying elements 29 are grounded through the second heatsink 35 and the rear bracket 3. In addition, leading wires 20 of the stator winding 14 are connected to second ends of the inserted conductors 21 using the stator winding connecting portions 43, and are connected to respective connecting points between the positive-side rectifying elements 28 and the negative-side rectifying elements 29 of the three-phase diode bridges. In addition, the field winding 9 is connected to the voltage regulator 18 through the slip rings 15 and the brushes 17.

Next, operation of an automotive alternator 1 that has been configured in this manner will be explained.

First, electric current is supplied to the field winding 9 of the rotor 8 by means of the brushes 17 and the slip rings 15 to generate magnetic flux. North-seeking (N) poles and South-seeking (5) poles are formed alternately in a circumferential direction on outer circumferential portions of the pole core 10 by this magnetic flux.

At the same time, rotational torque from an engine (not shown) is transmitted to the shaft 6 by means of a belt (not shown) and the pulley 7, to rotate the rotor 8. Thus, rotating magnetic fields are applied to the stator winding 14 in the stator 12, to generate electromotive forces in the stator winding 14. These alternating-current electromotive forces are rectified by the rectifying apparatus 30, and supplied to on-board loads, and to a battery, etc. The on-board loads are thereby driven, and the battery is charged.

The fans 11a and 11b rotate together with the rotation of the rotor 8. At the front end, cooling air flows into the front bracket 2 through the air intake apertures 2a, and flows axially to a vicinity of the rotor 8. There the cooling air is deflected centrifugally by the fan 11a, and is discharged outside the front bracket 2 through the air discharge apertures 2b. At the rear end, the cooling air flows into the protective cover 60 through the suction apertures 63, and passes through between the first radially inner fins 33a, between the first radially outer fins 33b, between the second radially inner fins 37b, and between the second radially outer fins 37a, and flows to a vicinity of the rear bracket 3. Next, cooling air flows into the rear bracket 3 through the air intake apertures 3a, and flows axially to a vicinity of the rotor 8. There the cooling air is deflected centrifugally by the fan 11b, and is discharged outside the rear bracket 3 through the air discharge apertures 3b.

A portion of the heat that is generated in the stator 12 is radiated from the coil ends 14a and 14b of the stator winding 14 to the cooling air that is deflected centrifugally by the fans 11a and 11b and that is discharged through the air discharge apertures 2b and 3b. In addition, a remaining portion of the heat that is generated in the stator 12 is transferred to the front bracket 2 and the rear bracket 3, and is radiated from the front bracket 2 and the rear bracket 3 to external air. The stator 12 is cooled thereby.

Heat that is generated by the positive-side rectifying elements 28 and the negative-side rectifying elements 29 is radiated to the cooling air that flows into the protective cover 60, and flows between the first radially inner fins 33a, between the first radially outer fins 33b, between the second radially inner fins 37b, and between the second radially outer fins 37a. The positive-side rectifying elements 28 and the negative-side rectifying elements 29 are cooled thereby.

Next, a main flow of cooling air in a vicinity of the rectifying apparatus 30 will be explained using FIG. 7.

First, negative pressure arises in a region between fan blades and the shaft 6 due to the rotation of the fan 11b.

On a radially inner side of the rectifying apparatus 30, a flow of cooling air 71 that flows into the protective cover 60 through the suction apertures 63 that are positioned upstream from the first radially inner fins 33a that are disposed on the radially inner side of the first rectifying element holding portion 32 arises due to the negative pressure portion 72 being formed. The cooling air that has flowed into the protective cover 60 flows axially between the first radially inner fins 33a, and absorbs the heat from the positive-side rectifying elements 28 that are held by the first rectifying element holding portion 32. Because the radially inner edge portion of the second heatsink 35 is positioned radially further outward than the radially outer edge portion of the bearing mounting portion 25, a space 73 is formed between the bearing mounting portion 25 and the second heatsink 35. A portion of the cooling air that has flowed between the first radially inner fins 33a flows axially between the second radially inner fins 37b that are disposed on a radially inner side of the second rectifying element holding portion 36, and absorbs the heat from the negative-side rectifying elements 29 that are held by the second rectifying element holding portion 36. The cooling air that has flowed between the second radially inner fins 37b flows axially toward the negative pressure portion 72. A remaining portion of the cooling air that has flowed between the first radially inner fins 33a flows axially through the space 73 toward the negative pressure portion 72, and absorbs the heat from the bearing 5 that is held by the bearing mounting portion 25.

On a radially outer side of the rectifying apparatus 30, a flow of cooling air 70 that flows into the protective cover 60 through the suction apertures 63 that are positioned upstream from the first radially outer fins 33b that are disposed on the radially outer side of the first rectifying element holding portion 32 arises due to the negative pressure portion 72 being formed. Because the radially outer edge portion of the second heatsink 35 is positioned radially further outward than the radially outer edge portion of the first heatsink 31, a space 64 is formed between the first heatsink 31 and the cylindrical portion 61 of the protective cover 60. A portion of the cooling air that has flowed into the protective cover 60 flows axially between the first radially outer fins 33b, and absorbs the heat from the positive-side rectifying elements 28 that are held by the first rectifying element holding portion 32. The cooling air that has flowed between the first radially outer fins 33b flows axially, and reaches the second heatsink 35. A remaining portion of the cooling air that has flowed into the protective cover 60 flows axially through the space 64, and reaches the second heatsink 35 with negligible temperature rise.

The cooling air that reaches the second heatsink 35 flows axially between the second radially outer fins 37a that are disposed on a radially outer side of the second rectifying element holding portion 36, and absorbs the heat from the negative-side rectifying elements 29 that are held by the second rectifying element holding portion 36. The cooling air that has flowed between the second radially outer fins 37a flows radially inward through a space 74 that is formed between the second heatsink 35 and the rear bracket 3 toward the negative pressure portion 72.

Here, the circuit board 40 is disposed so as to be spaced apart from the first rectifying element holding portion 32 and the second rectifying element holding portion 36 in an axial direction. Thus, radial ventilation channels 48 that communicate radially with a radially outer side and a radially inner side of the rectifying apparatus 30 are formed between the circuit board 40 and the first rectifying element holding portion 32 and between the circuit board 40 and the second rectifying element holding portion 36. Thus, a portion of the cooling air that has passed between the first radially outer fins 33b branches off, flows radially inward through the radial ventilation channels 48, and merges with the cooling air that has flowed between the first radially inner fins 33a. In addition, a portion of the cooling air that has passed through the space 64, which has barely risen in temperature, branches off, flows radially inward through the radial ventilation channels 48 with negligible temperature rise, and merges with the cooling air that has flowed between the first radially inner fins 33a.

The cooling air that has flowed through the radially inner side and the radially outer side of the rectifying apparatus 30 and reached the negative pressure portion 72 is deflected centrifugally by the fan 11b, flows radially outward through the rear end of the stator core 13, and absorbs the heat from the stator core 13 and the stator winding 14.

According to Embodiment 1, a circuit board 40 is disposed between a first rectifying element holding portion 32 and a second rectifying element holding portion 36 in a rectifying apparatus 30. Positive-side rectifying elements 28 and negative-side rectifying elements 29 are held by a first rectifying element holding portion 32 and a second rectifying element holding portion 36 so as not to overlap with each other in an axial direction. First rectifying element connecting portions 42 that are disposed so as to stand on the circuit board 40 are disposed inside second penetrating apertures 46 that are formed on the second rectifying element holding portion 36. Second rectifying element connecting portions 41 that are disposed so as to stand on the circuit board 40 are disposed inside first penetrating apertures 45 that are formed on the first rectifying element holding portion 32. Leading electrodes 28b of the positive-side rectifying elements 28 extend axially without being bent, and are welded to first ends of inserted conductors 21 of the first rectifying element connecting portions 42. Leading electrodes 29b of the negative-side rectifying elements 29 extend axially without being bent, and are welded to first ends of inserted conductors 21 of the second rectifying element connecting portions 41.

Thus, because lengths of the leading electrodes 28b of the positive-side rectifying elements 28 and the leading electrodes 29b of the negative-side rectifying elements 29 are shorter, axial dimensions of the rectifying apparatus 30 can be reduced, and increases in circumferential dimensions can also be suppressed. In addition, because it is not necessary to bend the leading electrodes 28b of the positive-side rectifying elements 28 and the leading electrodes 29b of the negative-side rectifying elements 29, reliability of the positive-side rectifying elements 28 and the negative-side rectifying elements 29 is improved, and a step of bending, and bending jigs, etc., are no longer required, also enabling manufacturing costs to be reduced. In addition, because the leading electrodes 28b and 29b are connected to the first rectifying element connecting portions 42 that are disposed inside the second penetrating apertures 46 of the second rectifying element holding portion 36 and the second rectifying element connecting portions 41 that are disposed inside the first penetrating apertures 45 of the first rectifying element holding portion 32, and are not in a state in which vicinities of the suction apertures 63 and the air intake apertures 3a are blocked, the amount of draw of cooling air through the suction apertures 63 and the air intake apertures 3a is ensured, suppressing deterioration in the cooling of the generator.

The first rectifying element connecting portions 42 are disposed in a loosely fitted state inside the second penetrating apertures 46 that are formed on the second rectifying element holding portion 36, and the second rectifying element connecting portions 41 are disposed in a loosely fitted state inside the first penetrating apertures 45 that are formed on the first rectifying element holding portion 32. Thus, electrical insulation is ensured between the first rectifying element connecting portions 42 and the second rectifying element holding portion 36, and electrical insulation is ensured between the second rectifying element connecting portions 41 and the first rectifying element holding portion 32. In addition, the first rectifying element connecting portions 42 and the second rectifying element connecting portions 41 are positioned inside the second rectifying element holding portion 36 and the first rectifying element holding portion 32, making it unnecessary to reduce the number of first radially inner fins 33a, first radially outer fins 33b, second radially inner fins 37b, and second radially outer fins 37a.

The positive-side rectifying elements 28 are held by the first rectifying element holding portion 32 so as to line up in a single row circumferentially so as to be spaced apart from each other, and the negative-side rectifying elements 29 are held by the second rectifying element holding portion 36 so as to line up in a single row circumferentially so as to be spaced apart from each other so as not to overlap with the positive-side rectifying elements 28 in an axial direction. Thus, because the radial width of the first rectifying element holding portion 32 can be made narrower, distances between the positive-side rectifying elements 28 and the first radially inner fins 33a are shortened, and distances between the positive-side rectifying elements 28 and the first radially outer fins 33b are also shortened. Similarly, because the radial width of the second rectifying element holding portion 36 can be made narrower, distances between the negative-side rectifying elements 29 and the second radially inner fins 37b are shortened, and distances between the negative-side rectifying elements 29 and the second radially outer fins 37a are also shortened. The positive-side rectifying elements 28 and the negative-side rectifying elements 29 can thereby be cooled effectively, and temperature differences between the positive-side rectifying elements 28 and the negative-side rectifying elements 29 are suppressed, enabling electric power generating efficiency to be improved.

The circuit board 40, which is disposed between the first heatsink 31 and the second heatsink 35, is formed so as to have an external shape (an outline) that does not protrude from the stacked body including the first rectifying element holding portion 32 and the second rectifying element holding portion 36 when viewed from an axial direction, except for the stator winding connecting portions 43, the housing linking portions 44, the voltage regulator connecting portion 47, and peripheral portions thereof. Thus, the circuit board 40 does not impede the flow of cooling air that arises due to formation of the negative pressure portion 72. Pressure loss as the cooling air flows through the rectifying apparatus 30 is thereby reduced, increasing the flow rate of the cooling air, and enabling the bearings 5 and the rectifying apparatus 30 to be cooled effectively. In addition, because the flow rate of the cooling air flowing through a vicinity of coil ends 14b of a stator winding 14 is increased, the amount of heat released from the coil ends 14b to the cooling air is increased, suppressing temperature increases in the stator 12, and enabling the performance of the automotive alternator 1 to be improved.

In the rectifying apparatus 30, protruding ends of the first radially inner fins 33a and the first radially outer fins 33b are positioned radially further inward than protruding ends of the second radially inner fins 37b and the second radially outer fins 37a.

Thus, there is no overlap between the first radially inner fins 33a and the second radially inner fins 37b in the axial direction near the protruding ends of the first radially inner fins 33a, reducing pressure loss when the cooling air flows through on the radially inner side of the rectifying apparatus 30. Furthermore, because the second radially inner fins 37b are configured so as to protrude in identical directions and overlap with the first radially inner fins 33a, i.e., such that the second radially inner fins 37b do not protrude beyond the first radially inner fins 33a when viewed from an axial direction, pressure loss when the cooling air flows through on the radially inner side of the rectifying apparatus 30 is further reduced. Thus, the flow rate of the cooling air that flows through on the radially inner side of the rectifying apparatus 30 is increased, enabling the positive-side rectifying elements 28 to be cooled effectively. In addition, because the portion of the cooling air that has flowed between the first radially inner fins 33a does not flow between the second radially inner fins 37b, temperature increases in the cooling air can be suppressed, enabling the cooling air to contribute to the cooling of the bearing mounting portion 25, thereby enabling the bearings 5 to be cooled effectively.

At the same time, because there is no overlap between the first radially outer fins 33b and the second radially outer fins 37a in the axial direction near the protruding ends of the second radially outer fins 37a, pressure loss when the cooling air flows through on the radially outer side of the rectifying apparatus 30 is reduced. Furthermore, because the first radially outer fins 33b are configured so as to protrude in identical directions and overlap with the second radially outer fins 37a, i.e., such that the first radially outer fins 33b do not protrude beyond the second radially outer fins 37a when viewed from an axial direction, pressure loss when the cooling air flows through on the radially outer side of the rectifying apparatus 30 is further reduced. Thus, the flow rate of the cooling air that flows through on the radially outer side of the rectifying apparatus 30 is increased. In addition, a portion of the cooling air reaches the second radially outer fins 37a without flowing between the first radially outer fins 33b. Because the flow rate of the cooling air that is supplied to the second radially outer fins 37a without raising the temperature is thereby increased, the negative-side rectifying elements 29 can be cooled effectively.

Radial ventilation channels 48 are formed between the first rectifying element holding portion 32 and the circuit board 40 and between the second rectifying element holding portion 36 and the circuit board 40. Thus, a portion of cooling air that has not risen in temperature, that has flowed through the radially outer side of the first radially outer fins 33b, branches off, passes through the radial ventilation channels 48, and flows on a radially inner side of the rectifying apparatus 30. The cooling air that has flowed on the radially inner side of the rectifying apparatus 30 through the radial ventilation channels 48 does not rise in temperature, and merges with the cooling air that has flowed between the first radially inner fins 33a. The temperature of the cooling air that has flowed between the first radially inner fins 33a is reduced thereby. A portion of the cooling air in which the temperature is reduced flows through the second radially inner fins 37b, enabling the negative-side rectifying elements 29 to be cooled effectively. Furthermore, a remaining portion of the cooling air in which the temperature is reduced flows through the space 73, enabling the bearing mounting portion 25 and the bearing 5 to be cooled effectively.

Here, because a portion of the cooling air that has flowed between the first radially outer fins 33b and through the space 64 branches off on a radially inner side so as to pass through the radial ventilation channels 48, the flow rate of the cooling air that flows through the second radially outer fins 37a is reduced, reducing the cooling performance of the second radially outer fins 37a. However, because the temperature of the cooling air that flows between the second radially inner fins 37b after flowing between the first radially inner fins 33a is reduced by merging with the cooling air that flowed through the radial ventilation channel 48 on the radially inner side of the rectifying apparatus 30, and the flow rate is increased, cooling performance of the second radially inner fins 37b is increased. The reduction in the cooling performance of the second radially outer fins 37a is thereby compensated for by an increase in cooling performance of the second radially inner fins 37b, suppressing temperature increases in the negative-side rectifying elements 29.

Next, flow of cooling air in the vicinity of the rectifying apparatus 30 will be explained using FIG. 8. Moreover, FIG. 8 explains the flow of cooling air that passes through the first penetrating apertures 45 that are formed on the first rectifying element holding portion 32.

The positive-side rectifying elements 28 and negative-side rectifying elements 29 are held in the rectifying apparatus 30 by a first rectifying element holding portion 32 and a second rectifying element holding portion 36 so as not to overlap with each other in an axial direction, and so as to line up in single rows circumferentially. The first rectifying element connecting portions 42 are disposed so as to stand on the circuit board 40 so as to pass through the second penetrating apertures 46 that are formed on the second rectifying element holding portion 36, and the second rectifying element connecting portions 41 are disposed so as to stand on the circuit board 40 so as to pass through the first penetrating apertures 45 that are formed on the first rectifying element holding portion 32. The leading electrodes 28b of the positive-side rectifying elements 28 extend axially without being bent, are inserted into the first rectifying element connecting portions 42, and are welded to first ends of the inserted conductors 21. The leading electrodes 29b of the negative-side rectifying elements 29 extend axially without being bent, are inserted into the second rectifying element connecting portions 41, and are welded to first ends of the inserted conductors 21. Thus, the rectifying apparatus 30 can be configured such that axial dimensions are reduced, and also such that circumferential dimensions are not increased excessively.

The positive-side rectifying elements 28 and negative-side rectifying elements 29 are held by a first rectifying element holding portion 32 and a second rectifying element holding portion 36 so as to each line up in a single row circumferentially. Thus, the distances between the positive-side rectifying elements 28 and the first radially inner fins 33a and between the positive-side rectifying elements 28 and the first radially outer fins 33b, the distance between the negative-side rectifying elements 29 and the second radially inner fins 37b, and the distance between the negative-side rectifying elements 29 and the second radially outer fins 37a can be shortened, increasing cooling of the positive-side rectifying elements 28 and the negative-side rectifying elements 29. However, because the first heatsink 31, the circuit board 40, and the second heatsink 35 are stacked axially, the cooling performance of the second heatsink 35, which is positioned on the downstream side falls below the cooling performance of the first heatsink 31, which is positioned on the upstream side.

In Embodiment 1, as shown in FIG. 8, the cooling air that has flowed in through the suction apertures 63, flows through the first penetrating aperture 45, and merges with the cooling air that flows radially inward between the first heatsink 31 and the circuit board 40 and between the second heatsink 35 and the circuit board 40. Then the cooling air that flows radially inward between the first heatsink 31 and the circuit board 40 and between the second heatsink 35 and the circuit board 40 merges with the cooling air that has flowed between the first radially inner fins 33a. Thus, because the flow rate of the cooling air that flows in between the second radially inner fins 37b is increased, and the temperature thereof is reduced, cooling performance of the second heatsink 35 that is positioned downstream is increased. The positive-side rectifying elements 28 and the negative-side rectifying elements 29 can thereby be cooled uniformly.

Embodiment 2

Figure 9:
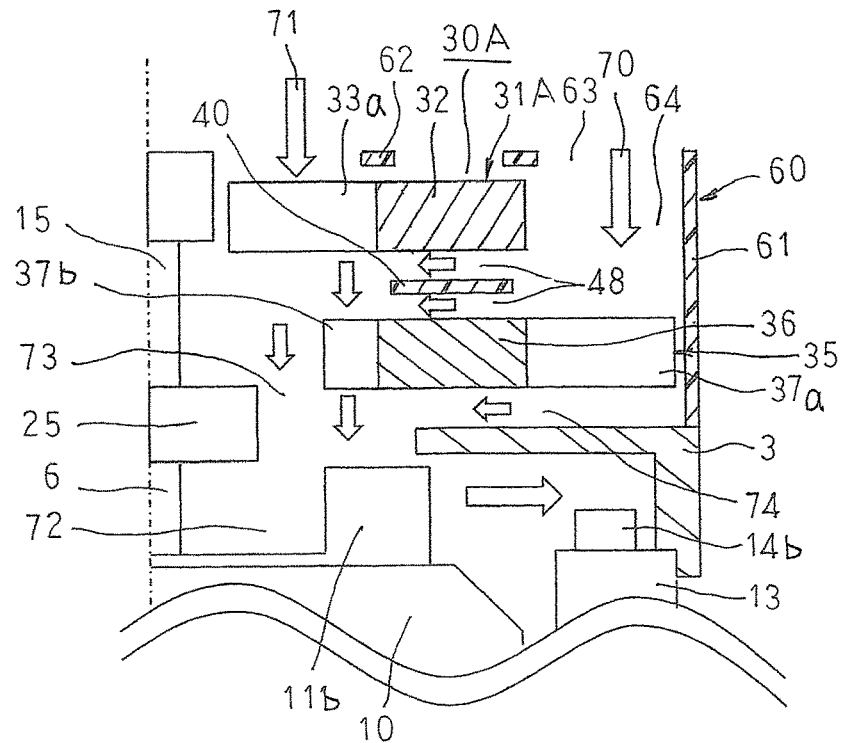
FIG. 9 is a schematic diagram that explains a flow of cooling air in a vicinity of a rectifying apparatus in an automotive alternator according to Embodiment 2 of the present invention.

FIG. 9 is a schematic diagram that explains a flow of cooling air in a vicinity of a rectifying apparatus in an automotive alternator according to Embodiment 2 of the present invention. Moreover, in FIG. 9, cooling air flow is represented by arrows.

In FIG. 9, only first radially inner fins 33a are disposed on a first rectifying element holding portion 32 on a first heatsink 31A.

Moreover, a remainder of the configuration is formed in a similar or identical manner to that of Embodiment 1 above.

On a radially outer side of a rectifying apparatus 30A that is configured in this manner, flows of cooling air 70 and 71 that flow into the protective cover 60 through the suction apertures 63 that are positioned upstream from the second radially outer fins 37a and the first radially inner fins 33a arise due to the negative pressure portion 72 being formed. Then, the cooling air that has flowed through the suction apertures 63 into the protective cover 60 flows between the first radially inner fins 33a, and then flows axially between the second radially inner fins 37b and through the space 73. The cooling air that has flowed through the suction apertures 63 into the protective cover 60 also flows axially through the space 64 between the first heatsink 31A and the cylindrical portion 61. A portion of the cooling air that has flowed through the space 64, and that has not risen in temperature, branches off, flows radially inward through the radial ventilation channel 48, and merges with the cooling air that has flowed between the first radially inner fins 33a. A remaining portion of the cooling air that has flowed through the space 64, and that has not risen in temperature, flows between the second radially outer fins 37a.

Consequently, similar or identical effects to those of Embodiment 1 above can also be achieved in Embodiment 2.

Embodiment 3

Figure 10:
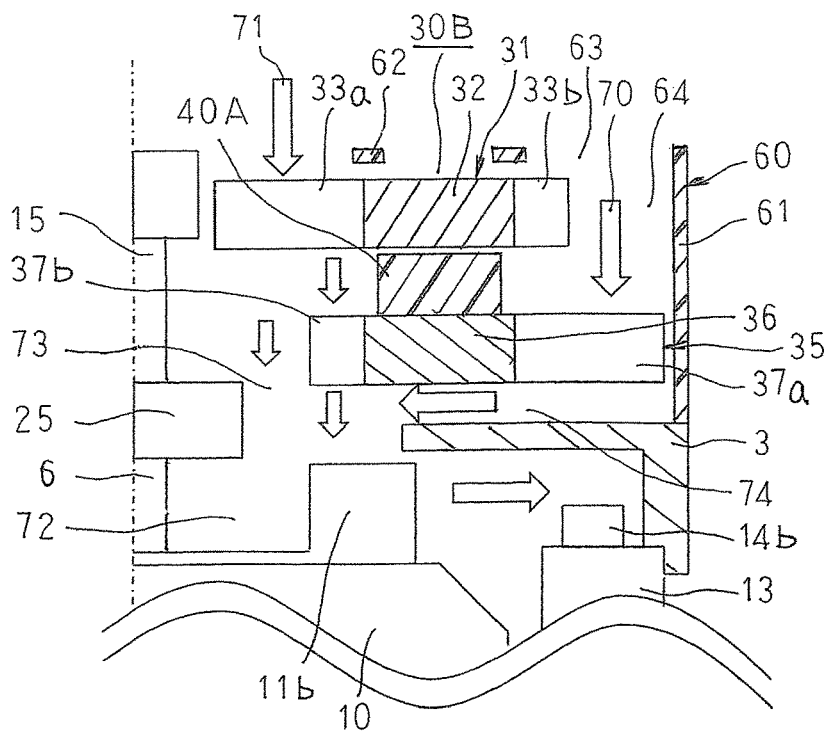
FIG. 10 is a schematic diagram that explains a flow of cooling air in a vicinity of a rectifying apparatus in an automotive alternator according to Embodiment 3 of the present invention.

FIG. 10 is a schematic diagram that explains a flow of cooling air in a vicinity of a rectifying apparatus in an automotive alternator according to Embodiment 3 of the present invention. Moreover, in FIG. 10, cooling air flow is represented by arrows.

In FIG. 10, a circuit board 40A is disposed so as to be spaced apart axially from a first rectifying element holding portion 32, and so as to contact a second rectifying element holding portion 36.

Moreover, a remainder of the configuration is formed in a similar or identical manner to that of Embodiment 1 above.

On a radially outer side of the rectifying apparatus 30B that is configured in this manner, a flow of cooling air 70 that flows into the protective cover 60 through the suction apertures 63 that are positioned upstream from the second radially outer fins 37a that are disposed on the radially outer side of the second rectifying element holding portion 36 arises due to the negative pressure portion 72 being formed. Here, because the circuit board 40A contacts the second rectifying element holding portion 36, a flow channel for cooling air that flows radially inward so as to pass between the circuit board 40A and the second rectifying element holding portion 36 is not formed. Thus, the flow rate of the cooling air that branches off radially inward from the cooling air that flows into the protective cover 60 through the suction apertures 63 and flows toward the second radially outer fins 37a is reduced. The flow rate of the cooling air that is supplied to the second radially outer fins 37a is thereby increased, enabling the negative-side rectifying elements 29 to be cooled effectively.

Thus, the radial dimensions of the second radially outer fins 37a on the radially outer side of the second rectifying element holding portion 36 can be made shorter so as to match the amount of heat generated in the negative-side rectifying elements 29, enabling the radial dimensions of the rectifying apparatus 30B to be reduced.

Moreover, in Embodiment 3 above, the circuit board 40A is disposed so as to contact only the second rectifying element holding portion 36, but the circuit board 40A may be disposed so as to contact both the first rectifying element holding portion 32 and the second rectifying element holding portion 36.

Embodiment 4

Figure 11:
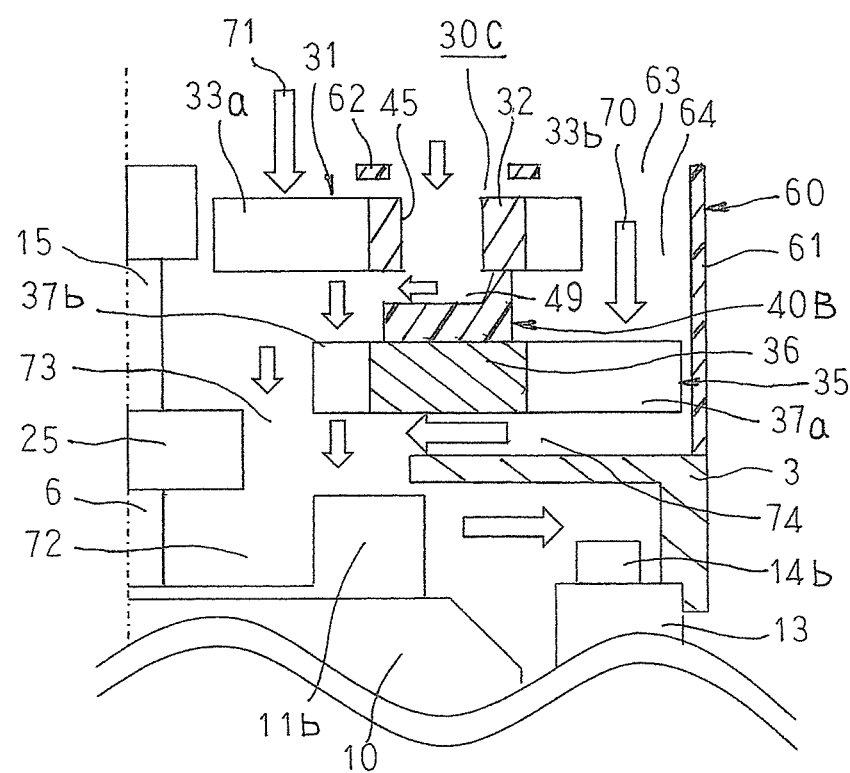
FIG. 11 is a schematic diagram that explains a flow of cooling air in a vicinity of a rectifying apparatus in an automotive alternator according to Embodiment 4 of the present invention.

FIG. 11 is a schematic diagram that explains a flow of cooling air in a vicinity of a rectifying apparatus in an automotive alternator according to Embodiment 4 of the present invention. Moreover, in FIG. 11, cooling air flow is represented by arrows.

In FIG. 11, a circuit board 40B is disposed so as to contact both a first rectifying element holding portion 32 and a second rectifying element holding portion 36. Guiding grooves 49 are formed so as to guide cooling air that has flowed through first penetrating apertures 45 so as to flow radially inward to portions of the circuit board 40B that face the first penetrating apertures 45.

Moreover, a remainder of the configuration is formed in a similar or identical manner to that of Embodiment 1 above.

In a rectifying apparatus 30C that is configured in this manner, the cooling air that has flowed in through the suction apertures 63 flows through the first penetrating apertures 45 and is led radially inward through the guiding grooves 49, and merges with the cooling air that has flowed between the first radially inner fins 33a that are disposed on a radially inner side of the first rectifying element holding portion 32. Thus, because the flow rate of the cooling air that flows in between the second radially inner fins 37b that are disposed on the radially inner side of the second rectifying element holding portion 36 is increased, and the temperature thereof is reduced, cooling performance of the second heatsink 35 that is positioned downstream is increased.

Moreover, in each of the above embodiments, the number of rotor poles is twelve poles, and the number of slots in the stator core is seventy-two, but the number of poles and the number of slots are not limited thereto.

In each of the above embodiments, cases in which the number of slots per phase per pole is two have been explained, but the number of slots per phase per pole is not limited to two.

In each of the above embodiments, first rectifying element holding apertures and second rectifying element holding apertures are formed on a first rectifying element holding portion and a second rectifying element holding portion such that regions of formation thereof do not overlap in an axial direction, but the regions of formation of the first rectifying element holding apertures and the second rectifying element holding apertures may overlap partially in an axial direction provided that the positive-side leading electrodes and the negative-side leading electrodes can extend axially without interfering with the negative-side rectifying elements and the positive-side rectifying elements.

In Embodiment 1 above, positive-side rectifying elements are first rectifying elements that are mounted to a first heatsink, and negative-side rectifying elements are second rectifying elements that are mounted to the second heatsink, but the positive-side rectifying elements may be the second rectifying elements that are mounted to the second heatsink, and the negative-side rectifying elements may be the first rectifying elements that are mounted to the first heatsink.

The invention claimed is:

1. An automotive alternator comprising:
 a housing;
 a rotor that is rotatably disposed inside said housing by being fixed to a shaft that is rotatably supported by means of bearings in bearing mounting portions that are formed on two axial end portions of said housing such that a central axis thereof is aligned with an axial direction of said housing;
 a stator that has:
  a cylindrical stator core; and
  a stator winding that is mounted to said stator core, said stator being held by said housing so as to be disposed coaxially around an outer circumference of said rotor;
 a fan that is fixed to a first axial end surface of said rotor, and that is rotated together with said rotor;
 a rectifying apparatus that is disposed outside a first axial end of said housing;
 a protective cover that is formed so as to have a cylindrical cup shape, that is disposed on said first axial end of said housing so as to cover said rectifying apparatus, and on a floor portion of which a suction aperture for cooling air is formed in a region that corresponds to said rectifying apparatus;
 an air intake aperture that is formed on a wall surface of said housing that faces said first axial end surface of said rotor; and
 an air discharge aperture that is formed on a wall surface of said housing that faces a coil end at a first axial end of said stator winding,
 a flow channel being configured such that said cooling air flows into said protective cover through said suction aperture due to rotation of said fan, cools said rectifying apparatus, and then flows through said air intake aperture into said housing, is deflected centrifugally by said fan, and is discharged through said air discharge aperture, wherein:
 said rectifying apparatus comprises:
  a first heatsink that has a flat first rectifying element holding portion that is disposed in a plane that is perpendicular to said axial direction of said housing;
  a plurality of first rectifying elements that are held by said first rectifying element holding portion;
  a second heatsink that has a flat second rectifying element holding portion that is disposed in a plane that is perpendicular to said axial direction of said housing, said second rectifying element holding portion being spaced apart from said first rectifying element holding portion toward said housing;
  a plurality of second rectifying elements that are each held by said second rectifying element holding portion; and
  a circuit board that has a stator winding connecting portion, a voltage regulator connecting portion, first rectifying element connecting portions, second rectifying element connecting portions, and a housing linking portion;
 said circuit board is disposed between said first rectifying element holding portion and said second rectifying element holding portion such that said first rectifying element connecting portions are disposed in a loosely fitted state inside a second penetrating aperture that is formed on said second rectifying element holding portion, and said second rectifying element connecting portions are disposed in a loosely fitted state inside a first penetrating aperture that is formed on said first rectifying element holding portion;
 first leading electrodes of said plurality of first rectifying elements respectively extend axially and are connected to each of said first rectifying element connecting portions; and
 second leading electrodes of said plurality of second rectifying elements respectively extend axially and are connected to each of said second rectifying element connecting portions.

2. The automotive alternator according to claim 1, wherein:
 said first rectifying element holding portion is produced so as to have an approximately circular arc belt shape that is disposed in a circular arc shape around a central axis of said shaft;
 a plurality of first radially inner fins are formed on a radially inner side of said first rectifying element holding portion so as to form a cooling airflow channel that is parallel to said axial direction of said housing between said first radially inner fins;

said second rectifying element holding portion is produced so as to have an approximately circular arc belt shape that is disposed in a circular arc shape around said central axis of said shaft; and a plurality of second radially outer fins are formed on a radially outer side of said second rectifying element holding portion so as to form a cooling airflow channel that is parallel to said axial direction of said housing between said second radially outer fins.

3. The automotive alternator according to claim 2, wherein:

a plurality of second radially inner fins are formed on a radially inner side of said second rectifying element holding portion so as to form a cooling airflow channel that is parallel to said axial direction of said housing between said second radially inner fins; and radially inner ends of said plurality of first radially inner fins are positioned radially further inward than radially inner ends of said plurality of second radially inner fins.

4. The automotive alternator according to claim 2, wherein:

a plurality of first radially outer fins are formed on a radially outer side of said first rectifying element holding portion so as to form a cooling airflow channel that is parallel to said axial direction of said housing between said first radially outer fins; and radially outer ends of said plurality of first radially outer fins are positioned radially further inward than radially outer ends of said plurality of second radially outer fins.

5. The automotive alternator according to claim 1, wherein said circuit board is disposed so as to be spaced apart from at least one of said first rectifying element holding portion and said second rectifying element holding portion in said axial direction.

6. The automotive alternator according to claim 1, wherein a guiding groove that guides cooling air that flows out of said first penetrating aperture so as to flow radially inward is formed on a surface of said circuit board that faces said first rectifying element holding portion.

7. The automotive alternator according to claim 1, wherein:

said first rectifying element holding portion and said second rectifying element holding portion have identical outlines when viewed from said axial direction; and said circuit board is configured such that only said stator winding connecting portion, said voltage regulator connecting portion, and said housing linking portion protrude from said first rectifying element holding portion and said second rectifying element holding portion when viewed from said axial direction.

* * * * *